US006957832B1

(12) United States Patent
Pannekoek

(10) Patent No.: US 6,957,832 B1
(45) Date of Patent: Oct. 25, 2005

(54) ELONGATE MEMBER WITH INTERCONNECTED ROTATABLE PORTIONS

(75) Inventor: Robert John Pannekoek, Mandurah (AU)

(73) Assignee: Safe Swivel Patent Co., Pty., Ltd, Greensfield (AU)

( * ) Notice: Subject to any disclaimer, the term of this patent is extended or adjusted under 35 U.S.C. 154(b) by 0 days.

(21) Appl. No.: 10/089,717

(22) PCT Filed: Oct. 4, 2000

(86) PCT No.: PCT/AU00/01208

§ 371 (c)(1),
(2), (4) Date: Apr. 2, 2002

(87) PCT Pub. No.: WO01/25687

PCT Pub. Date: Apr. 12, 2001

(30) Foreign Application Priority Data

Oct. 5, 1999 (AU) .................................... PQ3251

(51) Int. Cl.[7] ................................................ F16L 27/00
(52) U.S. Cl. ...................... 285/184; 285/181; 285/412; 285/414; 285/907; 248/122.1; 248/289.11
(58) Field of Search ................................ 285/184, 185, 285/181, 405, 414, 412, 368, 907; 248/121, 248/122.1, 558, 289.11

(56) References Cited

U.S. PATENT DOCUMENTS

| | | | | | |
|---|---|---|---|---|---|
| 128,303 | A | * | 6/1872 | Hammond | 285/90 |
| 1,090,970 | A | * | 3/1914 | Butler | 285/331 |
| 1,526,336 | A | * | 2/1925 | Hart | 285/31 |
| 1,605,507 | A | * | 11/1926 | Burke | 285/98 |
| 1,880,098 | A | * | 9/1932 | Mair | 285/184 |
| 2,178,240 | A | * | 10/1939 | Pascale | 55/301 |
| 2,199,897 | A | | 5/1940 | Stringer | |
| 2,479,580 | A | * | 8/1949 | Marco | 285/331 |
| 2,557,507 | A | | 6/1951 | Lang, Jr. | |
| 2,577,811 | A | | 12/1951 | Rutledge | |
| 2,629,465 | A | | 2/1953 | Rhea | |
| 3,355,847 | A | | 12/1967 | Pratt | |
| 3,551,006 | A | * | 12/1970 | James | 285/16 |
| 4,403,795 | A | * | 9/1983 | Davlin | 285/184 |
| 5,197,766 | A | * | 3/1993 | Glover et al. | 285/14 |
| 5,437,482 | A | * | 8/1995 | Curtis | 285/148.13 |
| 6,050,614 | A | * | 4/2000 | Kirkpatrick | 285/368 |

FOREIGN PATENT DOCUMENTS

| | | | | | |
|---|---|---|---|---|---|
| AU | 251043 | | * | 9/1962 | 285/184 |
| BE | 676861 | A | | 7/1966 | |
| DE | 7426588 | U | | 12/1974 | |
| DE | 2733571 | | | 2/1979 | |
| DE | 2918532 | | | 11/1980 | |
| FR | 964665 | | * | 8/1950 | 285/184 |
| GB | 28708 | | * | 12/1907 | 285/184 |
| GB | 1581928 | | | 12/1980 | |

* cited by examiner

*Primary Examiner*—James M. Hewitt
(74) *Attorney, Agent, or Firm*—Bachman & LaPointe, PC

(57) ABSTRACT

An elongate member (10) is provided having a first elongate portion (12), a second elongate portion (14) and an interconnecting joint (16). The interconnecting joint (16) is disposed at an acute angle to the first elongate portion (12) and rotation of the second elongate portion (14) about the interconnecting joint (16) allows a user access to an article (11) located at the upper end of the second elongate portion (14).

14 Claims, 7 Drawing Sheets

ELONGATE MEMBER WITH INTERCONNECTED ROTATABLE PORTIONS

FIELD OF THE INVENTION

The invention relates to an elongate member for locating an article in a location remote from a base plane.

It is known to provide an elongate member in the form of a pole for locating an article such as a light source in a location upwardly of and remote from a base position such as on the ground or an elevated platform. Such poles are commonly used in processing plants and refineries for illuminating the plant at night.

At present, one method of servicing or replacing the articles is by incorporating into the pole means for selectively permitting the pole to pivot about a substantially horizontal axis. In this way, the pole may be manually manipulated by a user to bring a remote end of the pole and thereby the article to a location sufficiently close to the user.

However, such poles may be in excess of 2 meters in length and as a consequence it may be difficult to safely manipulate the pole. In particular, there exists a significant risk of injury to persons adjacent the pole should the pole inadvertently fall.

An alternative known method of servicing or replacing the articles is to use a ladder. However, the use of ladders is particularly problematic in processing plants and refineries as the level of activity in the plant or refinery is generally high and the risk of unintentional dislodgment of the ladder is high.

The present invention seeks, therefore, among other things, to provide an elongate member which overcomes at least some of the above mentioned disadvantages.

SUMMARY OF THE PRESENT INVENTION

In accordance with an aspect of the present invention, there is provided an elongate member for locating an article remote from a base position, characterised in that the elongate member comprises a first elongate portion, the first elongate portion extending, in use, from the base position, a second elongate portion, the second elongate portion adapted to receive the article, and interconnecting means, the interconnecting means being arranged to connect the first elongate portion to the second elongate portion and to permit relative rotation of the first and second portions about an axis of rotation, the axis of rotation being disposed at an acute angle relative to a longitudinal axis of the first elongate portion.

BRIEF DESCRIPTION OF THE DRAWINGS

The present invention will now be described, by way of example only, with reference to the accompanying drawings, in which.

DESCRIPTION OF THE INVENTION

Figure 1:
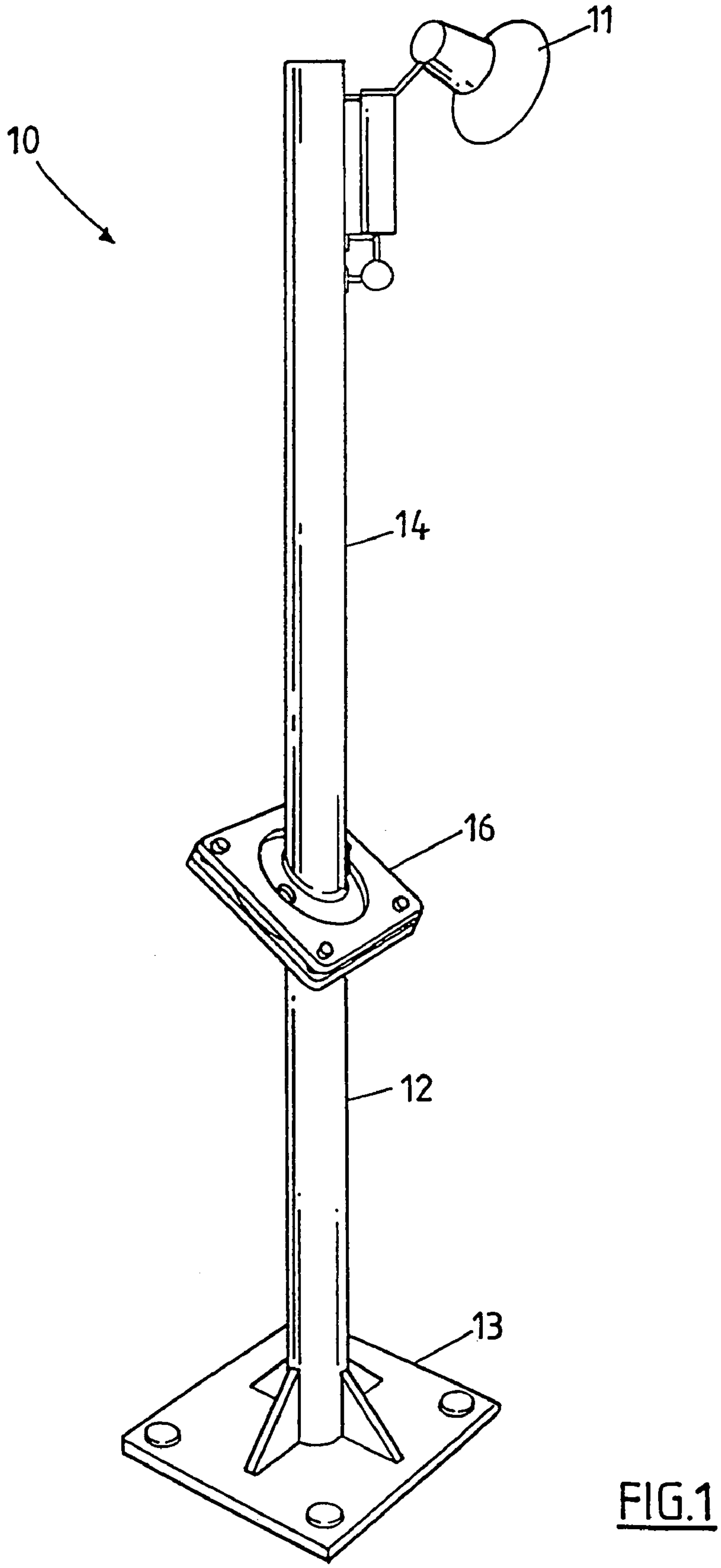
FIG. 1 is a diagrammatic perspective view of an elongate member in accordance with the present invention.
Figure 2:
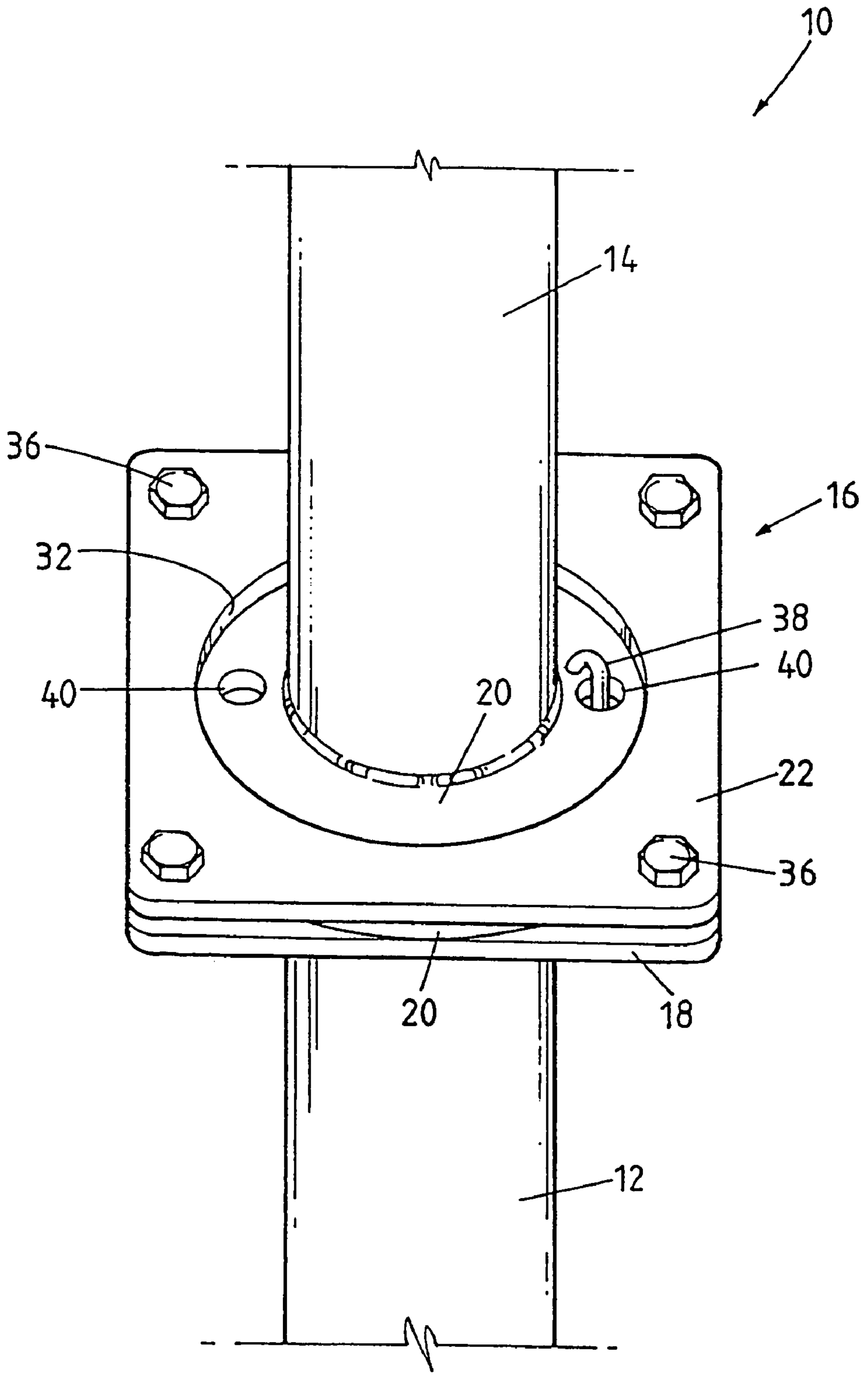
FIG. 2 is a diagrammatic perspective view of a portion of the elongate member shown in FIG. 1.

Referring to the drawings, there is shown an elongate member 10 for locating an article such as a light source 11 in a location upwardly of and remote from a base position 13 which may be on the ground or on an elevated platform.

In this example, the article will be taken to be a light source 11. However, it will be appreciated that other articles are envisaged, for example a flag or an antenna.

The elongate member 10 includes a first elongate portion 12, a second elongate portion 14 and interconnecting means 16 which is disposed between the first elongate portion 12 and the second elongate portion 14.

The first elongate portion 12 is substantially cylindrical in shape and is fixed at a lower end to the base position 13, and extends upwardly of the base position 13 to the interconnecting means 16.

The second elongate portion 14 is substantially cylindrical in shape and extends from the interconnecting means 16 to the light source 11.

The interconnecting means 16 includes a first plate member 18 which is fixedly connected to an upper end of the first elongate portion 12 at an acute angle relative to a longitudinal axis of the first elongate portion 12. The first plate member 18 has an upper surface 19 which faces away from the first elongate portion 12. The interconnecting means 16 further includes a second plate member 20 which is fixedly connected to a lower end of the second portion 14 at an acute angle relative to a longitudinal axis of the second portion 14. The second plate member 20 has a lower surface 21 which faces away from the second elongate portion 14. The acute angle of the first plate member 18 is preferably equal to that of the second plate member 20, and preferably is in the range 30°–60°. The interconnecting means 16 also includes a fixing means including a third plate member 22 which is separate from the first elongate portion 12 and the second elongate portion 14.

Figure 4A:
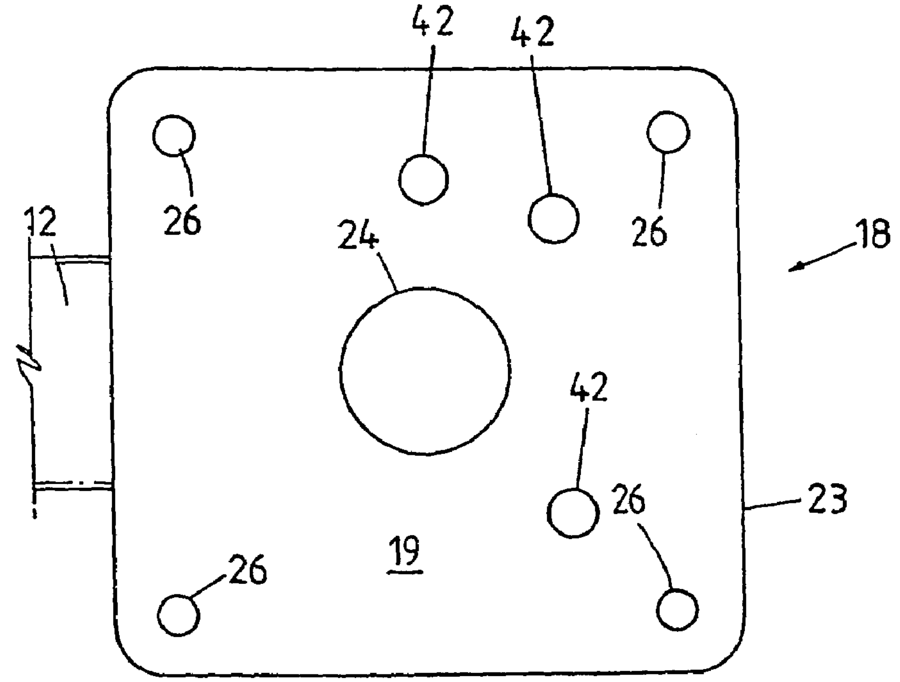
FIG. 4*a* is an upper plan view of a first plate member of an interconnecting means of the elongate member shown in FIGS. 1 to 3.
Figure 4B:
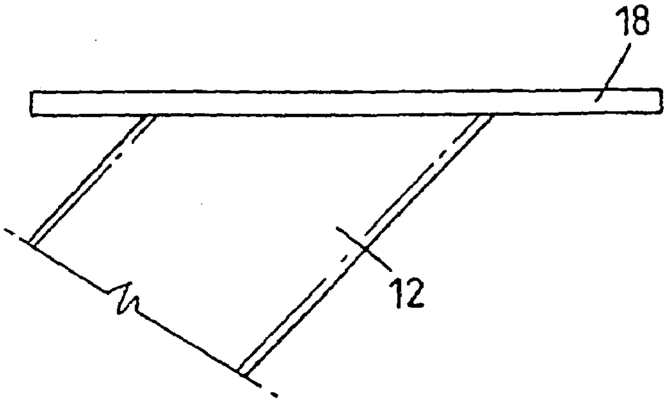
FIG. 4*b* is a side view of the first plate member of FIG. 4*a;*
Figure 5A:
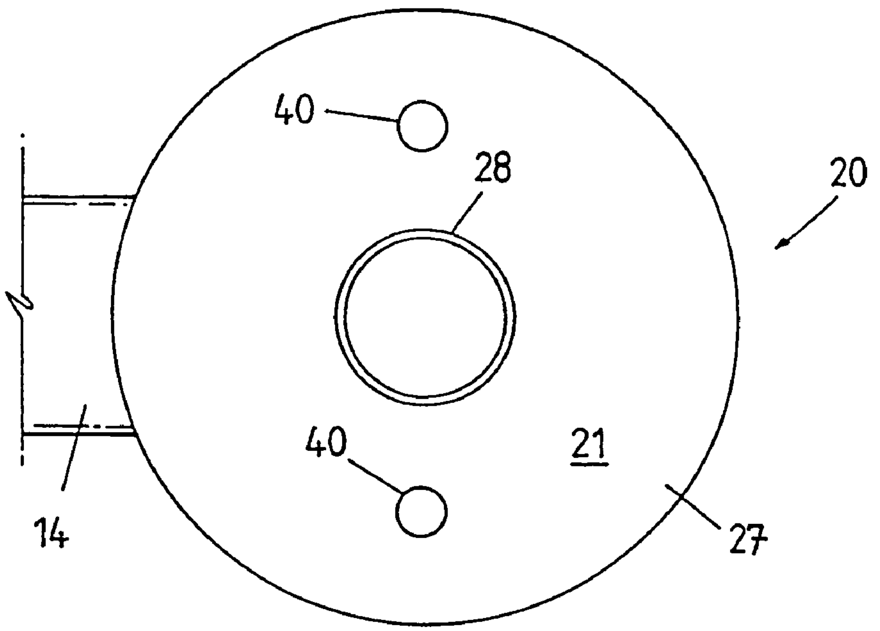
FIG. 5*a* is a lower plan view of a second plate member of an interconnecting means of the elongate member shown in FIGS. 1 to 3.
Figure 5B:
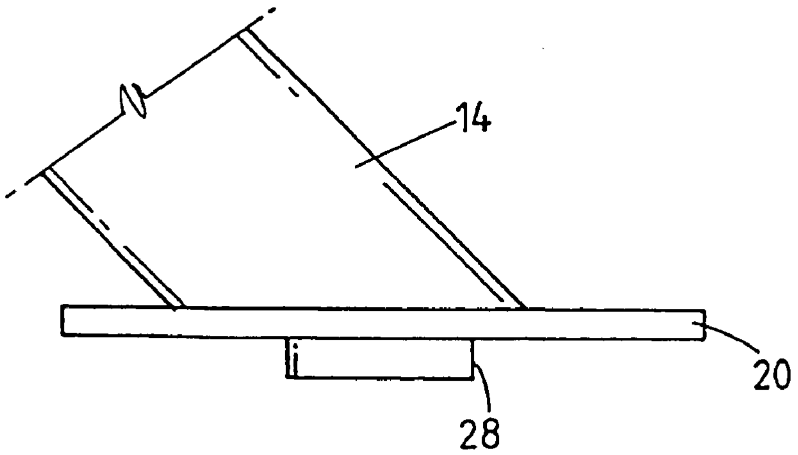
FIG. 5*b* is a side view of the second plate member of FIG. 5*a;*
Figure 6A:
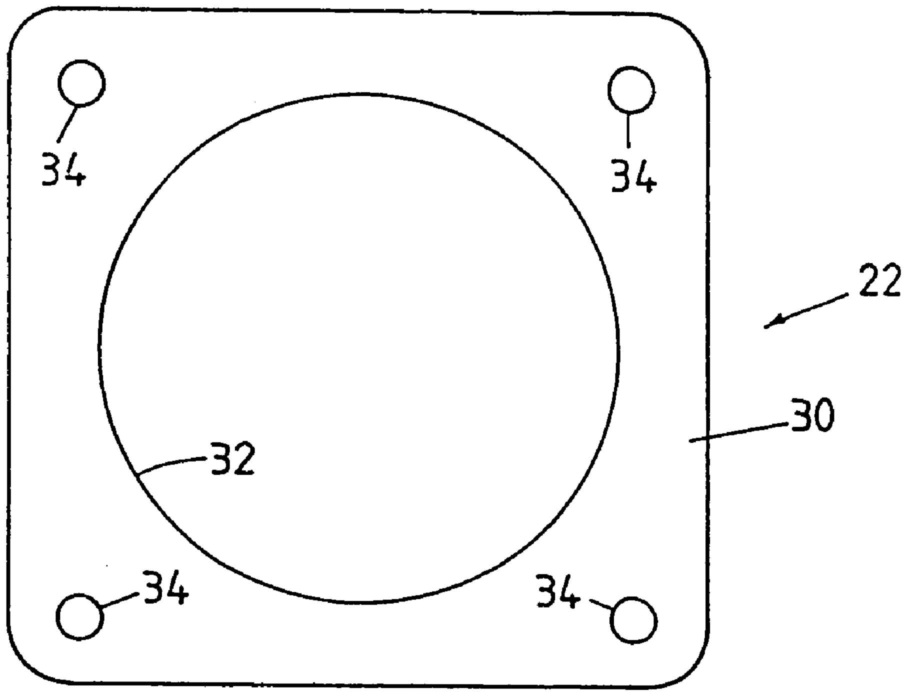
FIG. 6*a* is an upper plan view of a third plate member of an interconnecting means of the elongate member shown in FIGS. 1 to 3.
Figure 6B:
FIG. 6*b* is an upper plan view of third plate member of FIG. 6*a;*

The first, second and third plate members 18, 20 and 22 are shown more particularly in FIGS. 4, 5 and 6. The first plate member 18 includes a first substantially square shaped portion 23 provided with a generally centrally disposed first aperture 24 and four second apertures 26 each of which is disposed adjacent a corner of the first square shaped portion 23.

The second plate member 20 includes a substantially circular shaped portion 27 and a substantially centrally disposed cylindrical portion 28. The cylindrical portion 28 is fixedly connected to the circular shaped portion 27 and extends outwardly of the lower face 21 of the second plate member 20. The outer diameter of the cylindrical portion is slightly smaller than the diameter of the first aperture 24.

The third plate member 22 includes a second substantially square shaped portion 30 provided with a substantially centrally disposed third aperture 32 and four fourth apertures 34 each of which is disposed adjacent a corner of the second square shaped portion 30. The third aperture 32 is of larger diameter than the second elongate portion 14. The fourth apertures 34 are of similar diameter to the second apertures 26.

Figure 3:
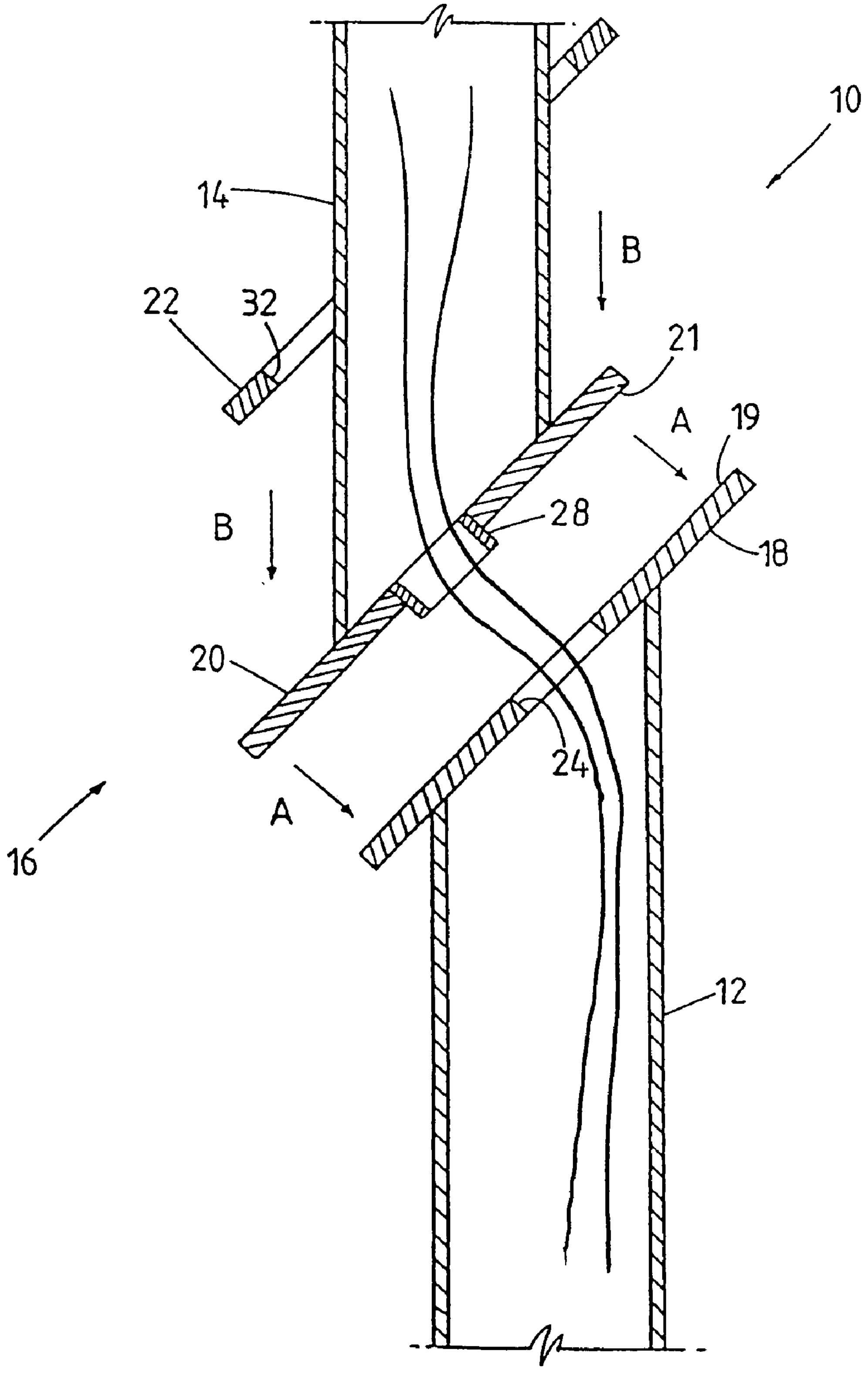
FIG. 3 is a diagrammatic exploded cross sectional view of the elongate member shown in FIGS. 1 and 2.
Figure 7:
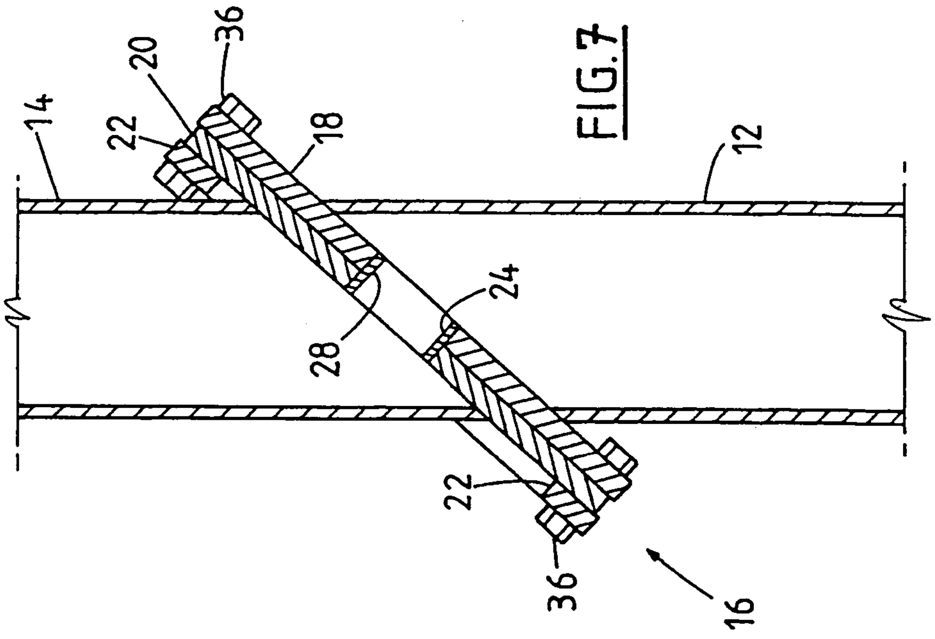
FIG. 7 is a diagrammatic cross sectional view of the elongate member shown in FIGS. 1, 2 and 3 with the elongate member shown in a first orientation.

The first and second plate members 18, 20 fit together with the upper surface 19 of the first plate member 18 adjacent the lower surface 21 of the second plate member 20, so that the cylindrical portion 28 of the second plate member 20 engages with the first aperture 24 in the first plate member 18 as shown by the arrows A in FIG. 3. The third plate member 22 is placed over the second plate 20 as shown by the arrows B in FIG. 3 such that the first, second and third plate members 18, 20, 22 are disposed relative to each other as best shown in FIG. 7. The first, second and third plate members 18, 20, 22 are fixed relative to each other by adjustable connection means 36, in this example nut and bolt arrangements which pass through the second and fourth apertures 26, 34 in the first and third plate members 18, 22 respectively. The adjustable connection means 36 act to restrict rotation of the first and third plate members 18, 22 relative to each other and to selectively permit or restrict rotation of the second plate member 20 and thereby the second elongate portion 14 about an axis perpendicular to the upper surface 19 of the first plate member 18.

It will be understood that when the adjustable connection means 36 are relaxed, the second plate member 20 and the second elongate portion 14 connected to the second plate member 20 are free to rotate relative to the first and third plate members 18, 22 and thereby relative to the first elongate portion 12, whilst the first and third plate members 18, 22 remain fixed relative to each other. When the adjustable connection means 36 are engaged, the second elongate portion 14 and the second plate 20 are not free to rotate relative to the first and third plates 18, 22. In order to facilitate rotation, it will be understood that the diameter of the third aperture 32 is sufficiently large to permit 360° rotation of the second portion 14 free of restriction.

The interconnecting means 16 may include a second fixing means provided by the use of a pin member 38. In this embodiment, the second plate member 20 includes two fifth apertures 40.

The fifth apertures 40 are arranged oppositely about the cylindrical portion 28, and are substantially equidistant from the cylindrical portion 28. The distance from the fifth apertures 40 to the centre of the cylindrical portion 28 is greater than the radius of the second elongate portion 14 and less than the radius of the third aperture 32 as seen in FIG. 1.

A plurality of sixth apertures 42 are provided within the first plate member 18. The sixth apertures 42 are of similar diameter to the fifth apertures 40. The distance from each sixth aperture 42 to the centre of the first aperture 24 is substantially the same as the distance from the fifth apertures 40 to the centre of the cylindrical portion 28.

The fifth and sixth apertures 40 and 42 are arranged such that when the first and second plate members are disposed at particular orientations, a fifth aperture 40 is aligned with a sixth aperture 42, thus providing a hole within which the pin member 38 may be engaged.

In normal use, the elongate member 10 locates in a first orientation as shown in FIGS. 1 and 7 wherein the first and second elongate portions 12, 14 are substantially co-axial to each other and aligned with each other, and the light source 11 is disposed at a location relatively remote from the base position 13.

Figure 8:
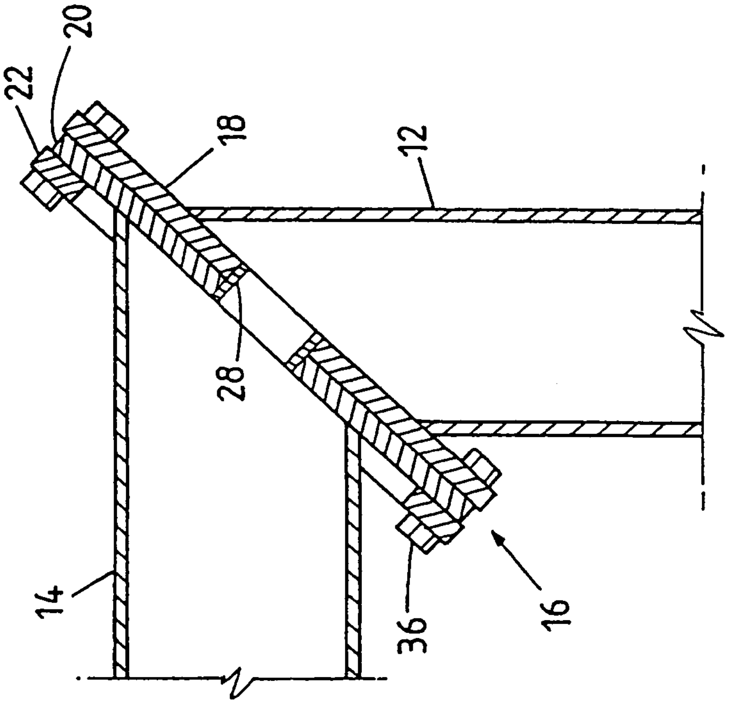
FIG. 8 is a diagrammatic cross sectional view of the elongate member shown in FIGS. 1 and 2 with the elongate member shown in a second orientation.

When it is desired to service or replace the light source 11, the pin member 38 is removed and the adjustable connection means 36 are released but not completely disengaged so as to permit rotation of the second plate member 20 relative to the first and third plate members 18, 22. As a result, the elongate member 10 is free to be moved by a user to a second orientation as shown in FIG. 8 wherein the second elongate portion 14 is disposed at an angle, which may be substantially 90°, relative to the first elongate portion 12 and the light source 11 is located in a position closer to the base position 13. The pin member 38 may then be inserted into a fifth aperture 40 which is aligned with a sixth aperture 42.

It will be understood that by appropriate selection of the location of the interconnecting means relative to the first and second elongate portions 12, 14, the distance between the second elongate portion 14 and the base position 13 when the elongate member 10 is in the second orientation may be selected so that the second elongate portion 14 is disposed sufficiently close to the base position 13 to allow a user to service or replace the light source 11 whilst still being held sufficiently remote from the base position 13 to avoid potential injury to persons adjacent the elongate member 10 should the fixing means fail when the elongate member 10 is in the first position.

It will be understood that in the above described example, electrical wires would be provided to supply electrical power to the light source 11. The wires may pass internally of the first and second elongate portions 12, 14 from the base position 13 to the light source 11. In this way, the wires are less likely to be damaged during use.

It will be appreciated that whilst in this embodiment the first and second elongate portions 12, 14 are substantially cylindrical, they may be formed of members of any suitably shaped cross-section, for example square shaped cross-section, the important aspect being that the outer surface of the second elongate portion 14 does not restrict rotation of the second elongate portion 14 within the third aperture 32 of the third plate member 22.

Modifications and variations as would be apparent to a skilled addressee are deemed to be within the scope of the present invention.

What is claimed is:

1. An elongate member for locating an article remote from a base position, characterised in that the elongate member comprises an inner elongate portion having a longitudinal axis, the inner elongate portion extending, in use, from the base position, an outer elongate portion, the outer elongate portion being arranged to receive the article, and means for interconnecting the inner elongate portion to the outer elongate portion so as to permit relative rotation of the inner and outer portions about an axis of rotation, the axis of rotation being disposed at an acute angle relative to the longitudinal axis of the inner elongate portion, the means for interconnecting the inner elongate portion to the outer elongate portion including a first member connected to the inner elongate portion, a second member connected to the outer elongate portion, a third member, and means for connecting adjustably the third member to the first member, the second member being located between the first member and the third member, the means for connecting adjustably the third member to the first member comprising at least one bolt arranged to pass through the first member and the third member, the bolt having an associated nut arranged such that tightening of the nut on the bolt causes the first member and the third member to apply a clamping force to the second member to prevent the relative rotation of the inner and outer elongate portions, and that partial release of the nut from the bolt causes the third member to be partially disengaged from the first and second members to permit the relative rotation of the inner and outer elongate portions, wherein the article comprises a light source and further comprising wires passing through the means for interconnecting for supplying electrical power to the light source.

2. An elongate member according to claim 1, characterised in that the outer elongate portion is arranged to move between a first position whereby the outer elongate portion is substantially co-axial to the inner elongate portion and a second position whereby the outer elongate portion is substantially perpendicular to the inner elongate portion.

3. An elongate member according to claim 1, characterised in that the acute angle is between 30° and 60°.

4. An elongate member according to claim 1, characterised in that the first member is a first plate member fixedly attached to the inner elongate portion at an end remote from the base position, and the second member is a second plate member fixedly attached to the outer elongate portion at an end remote from the article wherein, in use, the first plate member is located adjacent the second plate member.

5. An elongate member according to claim 4, characterised in that the first plate member has an upper surface and the second plate member has a lower surface, the upper surface of the first plate member being adjacent the lower surface of the second plate member in use, and the axis of rotation being perpendicular to the upper surface of the first plate member.

6. An elongate member according to claim 5, characterised in that the third member is a third plate member, the third plate member including a centrally disposed aperture and being arranged to locate, in use, about the outer elongate portion and adjacent the second plate member.

7. An elongate member according to claim 1, characterised in that the means for interconnecting the inner and outer elongate portions also includes a cylindrical portion arranged to be coaxial with the axis of rotation, and wherein the cylindrical portion extends from one of the inner and outer elongate portions and wherein the other of the inner and outer portions includes an aperture arranged to receive the cylindrical portion.

8. An elongate member according to claim 1, characterised in that the article includes a light source.

9. An elongate member according to claim 1, characterised in that the inner elongate portion is arranged to be mounted to a surface at the base position.

10. An elongate member according to claim 1, characterized in that the means for adjustably connecting the third member to the first member comprises at least two bolts.

11. An elongate member according to claim 1, characterized in that the means for adjustably connecting the third member to the first member comprises four bolts.

12. An elongate member according to claim 1, characterized in that the at least one bolt passes outside a peripheral edge of the second member.

13. An elongate member for locating an article remote from a base position, characterised in that the elongate member comprises an inner elongate portion having a longitudinal axis, the inner elongate portion extending, in use, from the base position, an outer elongate portion, the outer elongate portion being arranged to receive the article, and means for interconnecting the inner elongate portion to the outer elongate portion so as to permit relative rotation of the inner and outer portions about an axis of rotation, the axis of rotation being disposed at an acute angle relative to the longitudinal axis of the inner elongate portion, the means for interconnecting the inner elongate portion to the outer elongate portion including a first member connected to the inner elongate portion, a second member connected to the outer elongate portion, a third member, and means for connecting adjustably the third member to the first member, the second member being located between the first member and the third member, the means for connecting adjustably the third member to the first member comprising at least one bolt arranged to pass through the first member and the third member, the bolt having an associated nut arranged such that tightening of the nut on the bolt causes the first member and the third member to apply a clamping force to the second member to prevent the relative rotation of the inner and outer elongate portions, and that partial release of the nut from the bolt causes the third member to be partially disengaged from the first and second members to permit the relative rotation of the inner and outer elongate portions, further characterised in that the first member is a first plate member fixedly attached to the inner elongate portion at an end remote from the base position, and the second member is a second plate member fixedly attached to the outer elongate portion at an end remote from the article wherein, in use, the first plate member is located adjacent the second plate member, and further characterised in that the first plate member has at least one aperture, and the second plate member has at least one aperture, and wherein the aperture of the first plate member is adjacent to the aperture of the second plate member when the inner elongate portion and the outer elongate portion are arranged in a particular position, and wherein the means for interconnecting the inner and outer elongate portions includes a pin member arranged, in use, to locate within the aperture of the first plate member and the aperture of the second plate member and thus restrict relative rotation of the inner elongate portion and the outer elongate portion.

14. An elongate member according to claim 13, characterised in that the second plate member has a first aperture and a second aperture and wherein rotation of the outer elongate member portion relative to the inner elongate portion causes an aperture of the first plate member initially adjacent the first aperture of the second plate member to be subsequently adjacent the second aperture of the second plate member.

* * * * *